May 5, 1964   G. K. C. HARDESTY   3,131,670
ILLUMINATED MOVING HAND INSTRUMENT INDICATING DEVICES
Filed Dec. 7, 1960   3 Sheets-Sheet 1

INVENTOR.
G. K. C. HARDESTY
BY
AGENT.

May 5, 1964  G. K. C. HARDESTY  3,131,670
ILLUMINATED MOVING HAND INSTRUMENT INDICATING DEVICES
Filed Dec. 7, 1960  3 Sheets-Sheet 2

INVENTOR.
G. K. C. HARDESTY
BY Howard W. Hermann
AGENT.

INVENTOR.
G. K. C. HARDESTY
BY
Howard W. Hermann
AGENT.

3,131,670
ILLUMINATED MOVING HAND INSTRUMENT INDICATING DEVICES
George K. C. Hardesty, Box 156, Mayo, Md.
Filed Dec. 7, 1960, Ser. No. 74,439
19 Claims. (Cl. 116—129)
(Granted under Title 35, U.S. Code (1952), sec. 266)

The invention described herein may be manufactured and used by or for the Government of the United States of America for governmental purposes without the payment of any royalties thereon or therefor.

The present invention relates to the illumination of indicating instruments and, more particularly, to the illumination of moving hand type instrument indicating devices wherein light from the same source or plurality of sources is utilized to illuminate a movable pointer as well as the fixed indicia.

Superior communication of information from measurement and computing devices to the human operator or decision maker is a requirement of all modern high performance man-machine systems.

In vehicles such as the submarine or airplane, errors in indicating instrument interpretation can be immediately disastrous, resulting in loss of life and valuable equipment, as well as failure of the assigned mission. For an indicating device to be effective, the operator or decision maker must be able to read it. No matter how reliable and accurate it may be, an instrument which cannot be read is useless. Among the factors involved in making a visual instrument readable, illumination is certainly the most important.

Since the advent of highly transparent plastic sheet materials, many advances have been made in the art of instrument illumination. Among these is the technique known as edge lighting wherein light entering a panel between a pair of polished parallel or near parallel faces is conducted through the panel by reflection between the walls thereof to ultimately illuminate a desired area remote from the point or zone of entry of the light to the panel.

In prior art illumination systems it has been difficult to pipe sufficient light to the pointer and illuminate the indicia without causing glare from the light source and/or uneven illumination of the indicia. Slide rule type pointers have been illuminated extensively only by backlighting. Various types of systems have been designed for use in illuminating indicators of the type, but none has given optimum results under all conditions of ambient illumination.

The present invention utilizes the reflux lighting principle disclosed in co-pending application, Serial No. 74,438, filed Dec. 7, 1960, wherein light flux is recirculated through a reentrant light circuit according to the laws of total internal reflection, and in which direct viewing of the light source or sources is made impossible by the interposition of an opaque barrier between the light source or sources and the indicia which are to be illuminated. An air gap in the light flux circuit is provided and a portion of a piped light pointer is passed therethru. The pointer whereby intercepts a portion of the light flux passing across the gap and pipes it to the tip of the pointer. Thus, the light interceptor portion of the pointer may be moved anywhere in the gap with no detriment to the illumination level in the pointer. It will be seen, therefore, that the instant system functions either with axial type pointers or sliding type pointers and additionally provides optimum indicia illumination.

Thus an object of this invention is to provide an improved illuminated moving hand instrument indicating device.

Another object is the provision of an illumination system utilizing an efficient means of illuminating a piped light movable pointer as well as fixed indicia from the same source.

A further object is to provide an efficient illumination system for sliding pointer type indicators.

Other objects and many of the attendant advantages of this invention will be readily appreciated as the same becomes better understood by reference to the following detailed description when considered in connection with the accompanying drawings wherein.

Figure 1:
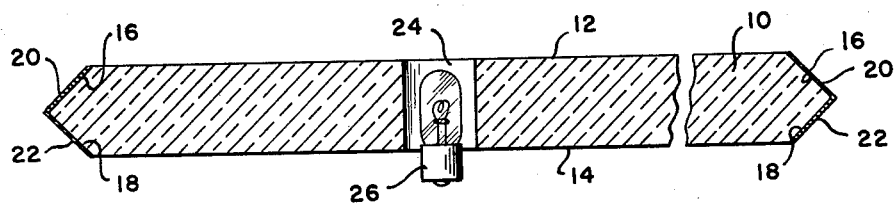
FIG. 1 is a cross sectional view of a flat edgelighted panel to illustrate the elementary principle of this invention.

Referring now to the drawings, wherein like reference characters designate like or corresponding parts throughout the several views, and wherein like numerals refer to elements of the same or similar function, the modifications thereof being indicated by letter subscript, there is shown in FIG. 1 a transparent light conducting plate 10 having a polished upper surface 12 and a polished lower surface 14. Plate 10 may be either rectangular or disk shaped and has a pair of oppositely beveled edges 16 and 18 each coated with light reflecting material 20 and 22 respectively. An aperture 24 is provided in the plate between the major surfaces thereof and a light source 26 is introduced therein.

Light flux emitted from light source 26 edge lights the plate 10 and is reflected between upper and lower major surfaces, 12 and 14 respectively, of the plate 10. The light reflective coatings 20 and 22 tend to reflect light flux which reaches them back through plate 10. Thus light emitted from source 26 and entering the plate 10 through aperture 24 is reflected within the plate 10 according to the laws of total internal reflection and the major part of the light reflux remains within the plate 10 to be reflected again and again. It is upon this principle that the present invention is based. It will be realized that in place of reflective coatings 20 and 22 on the beveled edges, highly polished surfaces on the beveled edge portions 16 and 18 will also function to reflect the major portions of the light back through the plate.

Figure 2:
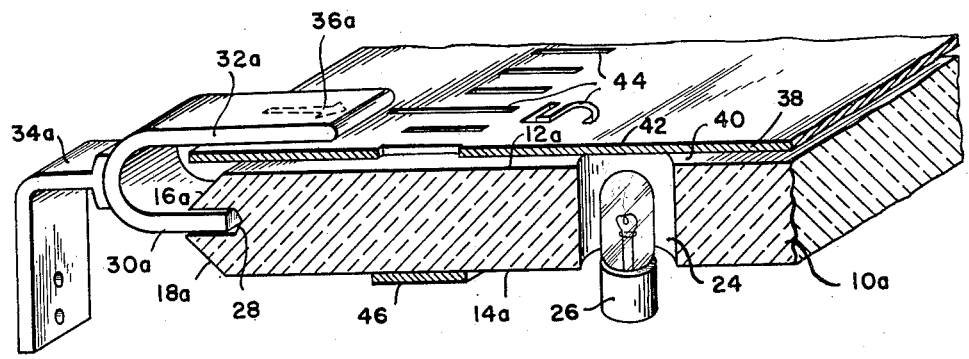
FIG. 2 is a modified view in perspective and including a partial cross section of an embodiment of the invention wherein a sliding pointer is utilized with a duo-panel system.

Referring now to FIG. 2, the above-described principle is applied to one embodiment of the invention. In this embodiment there is provided a light input plate 10a, generally similar to the panel shown in FIG. 1, having a polished upper surface 12a and a polished lower surface 14a and having an aperture 24 in which a light source 26 is mounted. At the apex of beveled edges 16a and 18a there is provided an elongated flux gap 28 through which the light input leg 30a of a U-shaped pointer 32a of transparent light conducting material is positioned for movement. A pointer positioning arm 34a has one end affixed to pointed 32a and the other attached to any suitable indicating instrument positioning element.

Light input leg 30a of pointer 32a is provided with light diffusing means for intercepting light passing through the gap 28 between beveled portions 16a and 18a. This may be accomplished either by finishing the surface of the leg 30a with a slight roughness to provide diffusion, providing prismatic shaped cuts in the surface, imbedding light diffusing elements in the leg, or coating the surface with light diffusing material. A portion of the light passing across gap 28 will thereby be directed between the polished surfaces of the remaining portions of the pointer 32a and to the index or pointer marking tip 36a of light diffusing material on the opposite leg of pointer 32a and thence the viewer.

An indicating panel 38 of the duo-panel type is provided above the light input plate 10a and is optically separated therefrom by an air space 40. Indicating panel 38 is of transparent light conducting material and has an opaque coating 42 in which a plurality of indicia openings 44 are provided. Below light input plate 10a, there are provided light diffusing patches 46 opposite indicia openings 44 whereby light is diffused directly across air gap 40 and indicating panel 38 to the observer from viewing openings 44. This duo-panel principle is described in detail in Patent No. 2,886,911 issued May 19, 1959, to George K. C. Hardesty.

Thus it will be seen that the pointer marking 36a will be illuminated no matter what its position along the illuminated indicia of the scale, but direct rays of light from source 26 are prevented from reaching the observer. It will also be seen that this system can be utilized to illuminate scales which are either rectangular or arcuate in form with no detriment in illumination level, and that a plurality of pointers and their corresponding scales could be illuminated from a single source.

Figure 3:
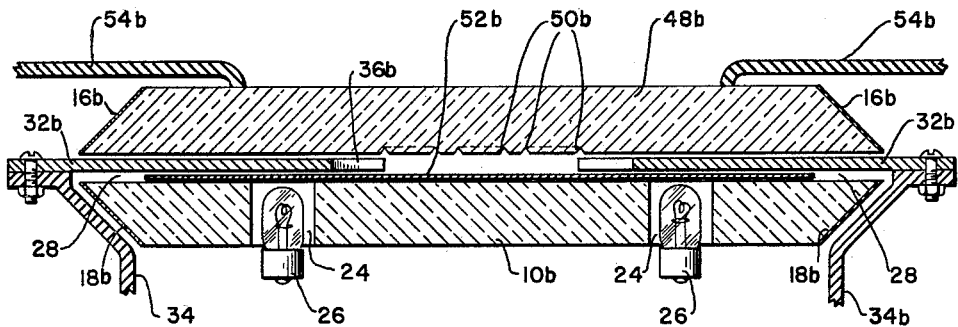
FIG. 3 is a cross sectional view of a second embodiment of the invention wherein multiple pointers are used in a reflux system.

In FIG. 3 there is shown an embodiment of the invention wherein a reflux structure is used for illumination of both pointer and scale. In this embodiment, a light conducting transparent input plate 10b, fitted with a pair of apertures 24 in which are mounted a pair of lamp sources 26, is mounted for cooperation with an edge lighted transparent indicia carrying panel 48b, which carries indicia 50b on a surface thereof. Indicia panel 48b is spaced from light input panel 10b by a flux gap 28 through which pointers 32b are mounted to pass. An opaque light barrier 52b is provided to prevent direct illumination of indicia 50b and the indicating tips 36b of pointers 32b by lamp sources 26. Pointers 32b are positioned by means of movable positioning arms 34b connected to suitable instrument positioners. A bezel or light shield 54b is positioned around the periphery of indicia panel 48b to prevent stray flux at the periphery from reaching the eyes of the viewer. Both light input plate 10b and indicia panel 48b have beveled edges, 18a and 16b respectively, each coated with reflective material or polished to reflect incident light.

In operation, light flux from sources 26 through the walls of the apertures 24 and is reflected according to the laws of total internal reflection between the major faces of light input plate 10b until it reaches bevelled portions 18b whereupon it is reflected across flux gap 28 into indicia element 48b wherein it is reflected by bevelled portions 16b between the major faces of element 48b with the exception of light diffusely or specularly reflected out of the system by indicia 50b. Any light flux not leaving the system is recirculated back to light input plate 10b and thence again through the reentrant circuit. Pointers 32b have light diffusing means thereon at the flux gap 28 to divert a portion of the light flux into the pointer 32b and cause it to be carried to the pointer indicator tip 36b. Due to extremely low losses in the system, this type of device is capable of high illumination efficiency without unevenness or glare. Indicia panel 48b can be of any desired length since lamp sources 26 may be increased in number and distributed as desired over the expanse of the input light plate 10b.

Figure 4:
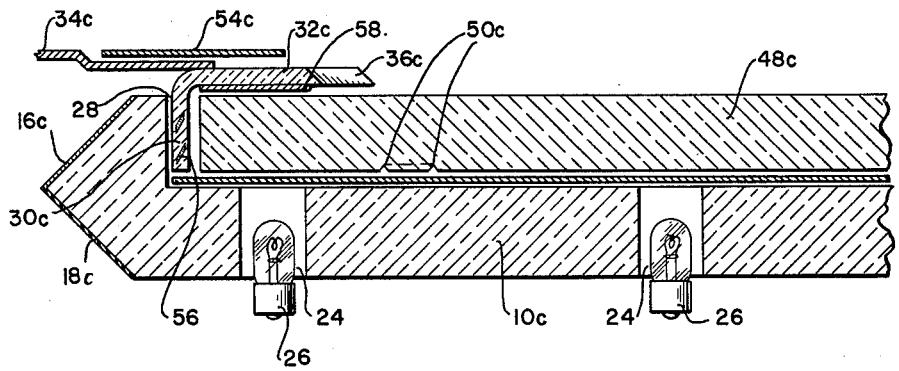
FIG. 4 is a cross sectional view of another embodiment of the invention wherein a different type of reflux lighting is utilized.

In FIG. 4 there is shown an embodiment which in many respects is similar to that shown in FIG. 3. In this embodiment both bevelled portions 16c and 18c are provided on a light conducting transparent input plate 10c which is edgelighted by lamp sources 26 each mounted in an aperture 24. An indicia carrying panel 48c carrying indicia 50c is mounted on the opposite side of an opaque light barrier 52c from light input panel 10c. A flux gap 28 is provided between input panel 10 and indicia panel 48c, through which the light input leg 30c of a pointer 32c is mounted for traverse. Pointer 32c is controlled by a positioning arm 34c, and a light shield or bezel 54c is provided around the periphery of the indicator to prevent glare light from reaching the eyes of the observer. A second light shield 58c below the pointer 32c may also be provided. Light diffusing elements 56c are provided in the light input leg 30c of pointer 32c to cause light to be transmitted to pointer indicator tip 36c. This arrangement is particularly effective in circular dials having pointers positioned by shafts in the center of the dial and yet requiring a peripheral index or pointer projecting into the circular field of view to indicate some function such as desired compass heading or desired speed.

Figure 5:
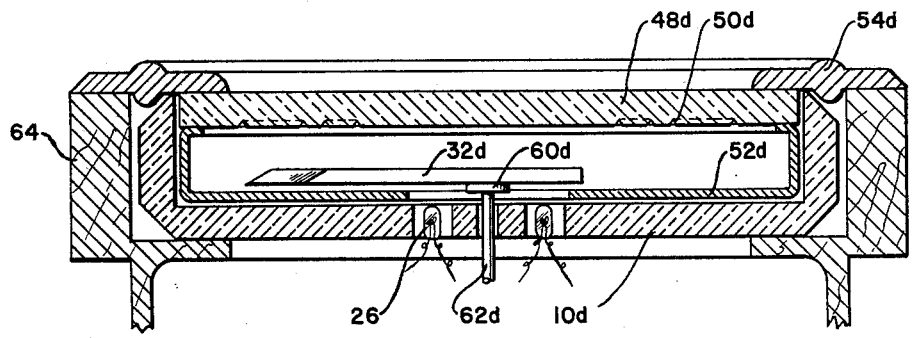
FIG. 5 is a cross sectional view of another embodiment of the invention wherein a rotatable piped light pointer is utilized in conjunction with a see-through reflux instrument dial.
Figure 6:
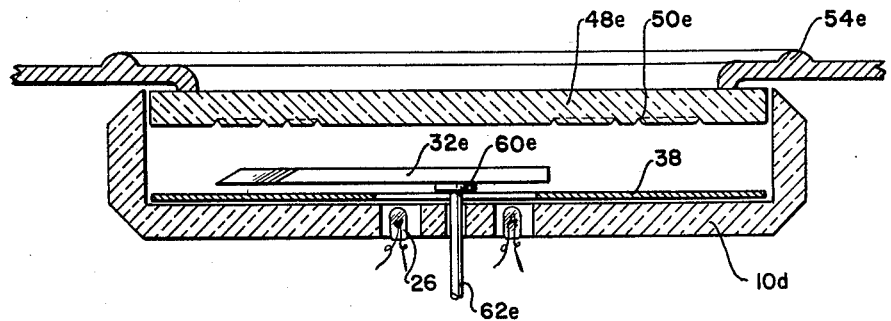
FIG. 6 is a cross sectional view of a further embodiment of the invention wherein a rotatable piped light pointer is used in conjunction with a combined reflux and duo-panel indicating structure.
Figure 7:
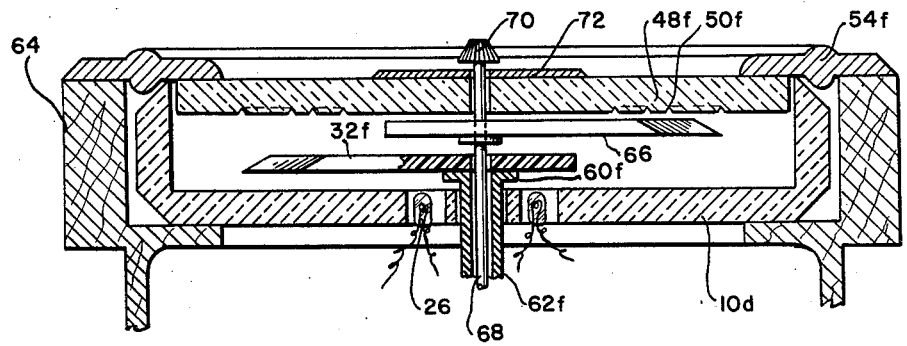
FIG. 7 is a cross sectional view of a reflux instrument dial using multiple pointers.

Referring now to FIGS. 5–7, there are shown three embodiments of the invention in which a rotatable axially driven piped light pointer is utilized in conjunction with reflux dial illumination. In each of the respective embodiments of FIGURES 5–7, and referring to FIG. 5, light is introduced into a light conducting transparent input plate 10d from sources 26 mounted in apertures 24 and is carried through input plate 10d and an indicia panel 48d to illuminate indicia 50d, and a bezel 54d is provided around periphery of the indicia panel 48d. A piped light pointer 32d is mounted by means of a light-conducting hub 60d on a light conducting rotatable positioning shaft 62. It will be noted from FIG. 5 that an opaque light barrier 52d has a large opening at the point of entry of shaft 62 to allow direct illumination of the hub of pointer 32d by lamp sources 26 and thereby enhance the pointer illumination. In FIGS. 5 and 7, the indicating system is mounted within a case 64.

In FIG. 6 a bezel 54e is designed to rotate indicia carrying panel 48e and a duo-panel type opaque indicia panel 38, similar to that shown in FIG. 2, is provided above light input element 10d for secondary indicia. Thus panel 48c can be turned to the desired setting and duo-panel 38 read for actual readings.

In FIG. 7 a second pointer 66 carried by a shaft 68 rotatably supported by an indicia-carrying panel 48f, and having a knob 70 for pointer positioning, is carried coaxially with a pointer 32f. A downwardly directed light diffusing patch 72 having an opaque upper surface is mounted above the hub of pointer 66 for directing light downwardly thereto to thereby illuminate the pointer.

It wil be realized that many modifications of the aforementioned embodiments are possible without departing from the spirit of the invention. For example, electroluminescent or fluorescent type light sources may be utilized in place of the lamp sources shown. The shapes of the light conducting panels may be varied as long as light will still be conducted thereby in accordance with the laws of total internal reflection. The placement of the flux gap may also be varied somewhat to suit the needs of the individual designer. Light dimming or light valving or color filtering elements may be assembled permanently or selectively positioned within the flux gap to vary the intensity or color of the illuminated pointers and indicia in general accordance with the teachings of the co-pending application previously mentioned. Such elements may be manually positioned or remotely controlled through the use of suitable transducer-actuators.

Obviously many modifications and variations of the present invention are possible in the light of the above teachings. It is therefore to be understood that within the scope of the appended claims the invention may be practiced otherwise than as specifically described.

What is claimed is:

1. An illuminable indicating instrument comprising a reentrant light circuit having a gap therein, a light source for providing light flux to said circuit, and a movable pointer of light conducting material having a portion extending into said gap in said reentrant light circuit for receiving light flux therefrom.

2. An illuminable indicating instrument as defined in claim 1 and further comprising an opaque light shield interposed between said light source and an indicia carrying portion of said reentrant light circuit.

3. An indicating instrument having an illuminable pointer as defined in claim 1 wherein said reentrant light circuit comprises a light conducting transparent plate having parallel reflective major faces and beveled reflective end portions and wherein said light source is introduced into an aperture in said plate whereby light from said source is directed between the major faces thereof.

4. The invention as defined in claim 1 wherein said reentrant light circuit comprises a light conducting input plate having an aperture therein in which is mounted said light source, and a light-conducting indicia-carrying panel; said gap being provided between said light conducting input panel and said light conducting indicia panel.

5. An indicating instrument as claimed in claim 1 and further comprising an indicia plate spaced from said reentrant light circuit, said indicia plate having an opaque coating with openings representing the indicia to be illuminated and a light diffusing patch mounted on said reentrant light circuit opposite the indicia openings in said opaque coating of said indicia panel.

6. The invention as defined in claim 1 wherein said pointer has a light-conducting hub and said light source is mounted adjacent said pointer for additionally providing light flux to the hub of said pointer.

7. The invention as described in claim 1 wherein a pair of pointers, each having a hub, are mounted coaxially, one pointer being positioned outside the other, the hub of the inner one of said coaxially mounted pointers being positioned adjacent said light source to receive light therefrom, and a light reflecting patch mounted on said reentrant light circuit adjacent the hub of the outer coaxially mounted pointer for reflecting light to the hub of the outer pointer.

8. An illuminable indicating instrument comprising a light conducting input element having a light source mounted therein, a light receiving element bearing illuminable indicia and adapted to receive light from said light input element, reflecting means for reflecting light from said light input element to said indicia-carrying light-receiving element, an air gap, a pointer of light conducting material having a portion thereof mounted for traverse through said air gap, and means on the portion of said pointer in said air gap for intercepting a portion of the light crossing said gap and causing it to be reflected to an indicating portion of said pointer for the illumination thereof.

9. An indicating instrument as defined in claim 8 and further including an opaque light shield interposed between said light source and the indicia carried by said light receiving indicia panel.

10. The invention as defined in claim 9 wherein the light reflecting means for reflecting light from said light input panel to said light receiving indicia carrying panel comprises beveled portions on at least one of said panels and reflective coating on said beveled portions.

11. The invention as defined in claim 8 wherein said light receiving indicia carrying panel is provided with an opaque coating and said indicia consists of openings in said opaque coating, and said reflecting means is a light reflecting patch on said light input panel opposite said openings in said opaque coating of said indicia panel.

12. An illuminable indicating instrument comprising a light input element having an aperture therein a light source mounted in said aperture, an indicia-bearing light-receiving element, there being beveled portions on at least one of said elements for reflecting light from said light input element into said indicia-bearing light-receiving element, a bezel located around the periphery of said indicia-bearing light-receiving element, a rotatable pointer of light conducting material mounted between said light input element and said indicia-bearing light-receiving element, said pointer having a hub adapted to receive light from said light source; and a rotatable shaft of light conducting material connected to said hub and passing through a gap in said light-receiving panel.

13. An indicating instrument as defined in claim 12 wherein an indicia panel of light transmitting material and having an opaque coating with indicia openings therein is provided between said light input panel and said pointer, and said light-receiving indicia-bearing panel is mounted for rotation relative to said light input panel.

14. An indicating instrument as defined in claim 12 wherein a second pointer is mounted coaxially of said first pointer, said second pointer having a hub and shaft, and wherein a light reflecting patch is mounted on the outside of said indicia bearing panel for reflecting light to the hub of said second pointer.

15. An indicating instrument as defined in claim 14 wherein an extension is provided on said shaft of said second pointer, said extension passing through said indicia-bearing light-receiving panel and having a rotatable knob attached to said shaft outside said panel for manual positioning of said second pointer.

16. An illuminable indicating instrument comprising a first body of light-conducting material and a second body of light-conducting material mounted in spaced relationship to said first body, a source of light for said first body, the path of light rays transmitted therefrom being a reentrant loop through both of said bodies and at least a portion of the space therebetween, a movable pointer of light-conducting material adapted to receive light transmitted thereto from said first body and extending into the space between said first and second bodies, said movable pointer having an essentially diffusive surface portion located thereon for viewing purposes.

17. Apparatus according to claim 16, including a third body of essentially opaque material for blocking at least a substantial portion of light rays from directly illuminating said pointer, whereby increased contrast is provided between the light transmitted from said diffusive surface and any other light.

18. Apparatus according to claim 16, wherein a light-transmitting surface of said first body is located opposite an essentially diffusive light-receiving surface of said pointer, said light receiving surface being remote from said essentially diffusive surface of said pointer.

19. Apparatus according to claim 16, wherein said second body includes indicia located thereon, said indicia being formed by discontinuities in a surface portion of said second body.

References Cited in the file of this patent

UNITED STATES PATENTS

| 2,606,277 | Triplett | Aug. 5, 1952 |
| 2,805,505 | Hardesty | Sept. 10, 1957 |
| 2,837,052 | Vinet | June 3, 1958 |
| 2,837,053 | Vinet | June 3, 1958 |
| 2,886,911 | Hardesty | May 19, 1959 |
| 2,906,048 | Kraus | Sept. 29, 1959 |

FOREIGN PATENTS

| 816,795 | France | May 10, 1937 |